(12) United States Patent
Morini et al.

(10) Patent No.: US 7,482,413 B2
(45) Date of Patent: Jan. 27, 2009

(54) MAGNESIUM DICHLORIDE-ALCOHOL ADDUCTS AND CATALYST COMPONENTS OBTAINED THEREFROM

(75) Inventors: Giampiero Morini, Padova (IT); Giulio Balbontin, Savona (IT); Fabrizio Piemontesi, Ferrara (IT); Maria Fusto, Ferrara (IT); Gianni Vitale, Ferrara (IT); Giansiro Prini, Castelguglielmo-Rovigo (IT)

(73) Assignee: Basell Poliolefine Italia s.r.l., Milan (IT)

( * ) Notice: Subject to any disclaimer, the term of this patent is extended or adjusted under 35 U.S.C. 154(b) by 162 days.

(21) Appl. No.: 10/550,986

(22) PCT Filed: Mar. 9, 2004

(86) PCT No.: PCT/EP2004/002519

§ 371 (c)(1),
(2), (4) Date: Sep. 26, 2005

(87) PCT Pub. No.: WO2004/085495

PCT Pub. Date: Oct. 7, 2004

(65) Prior Publication Data

US 2006/0217261 A1    Sep. 28, 2006

Related U.S. Application Data

(60) Provisional application No. 60/460,643, filed on Apr. 4, 2003.

(30) Foreign Application Priority Data

Mar. 27, 2003   (EP) .................................. 03075872

(51) Int. Cl.
   C08F 4/42        (2006.01)
(52) U.S. Cl. .................. 526/124.2; 526/124.3; 526/142; 526/348; 502/103; 502/115; 502/118; 502/123
(58) Field of Classification Search ............. 526/124.2, 526/124.3, 142, 348; 502/103, 115, 118, 502/123
   See application file for complete search history.

(56) References Cited

U.S. PATENT DOCUMENTS

| 4,399,054 | A |   | 8/1983  | Ferraris et al. .......... 252/429 B |
| 4,506,027 | A | * | 3/1985  | Invernizzi et al. ............. 502/9 |
| 5,221,651 | A | * | 6/1993  | Sacchetti et al. ........... 502/126 |
| 5,374,695 | A | * | 12/1994 | Tanaglia et al. .......... 526/124.8 |

FOREIGN PATENT DOCUMENTS

| EP | 0 123 767       | * | 11/1984 |
| EP | 0123767         |   | 11/1984 |
| EP | 0 395 083       | * | 10/1990 |
| EP | 0 395 083 A2    | * | 10/1990 |
| EP | 0395083         |   | 10/1990 |
| EP | 0522650         |   | 1/1993  |
| EP | 0 544 340       | * | 6/1993  |
| EP | 0544340         |   | 6/1993  |
| JP | 61023605        |   | 2/1986  |
| JP | 03140308        |   | 6/1991  |
| WO | 9844009         |   | 10/1998 |

OTHER PUBLICATIONS

PCT International Preliminary Report on Patentability Transmittal; Written Opinion of the International Search Report for PCT/EP2004/002519, Issued on Oct. 1, 2005; (5 pages.).

Jun. 6, 2007 Response to EP Communication Issued on Dec. 11, 2006, EP application No. 04 709 240.8-2109; (5 pages.).

* cited by examiner

*Primary Examiner*—Ling-Sui Choi
(74) *Attorney, Agent, or Firm*—Jarrod N. Raphael

(57) ABSTRACT

The present invention relates to $MgCl_2 \cdot (EtOH)_m (ROH)_n (H_2O)_p$ adduct in which R is a C1-C15 hydrocarbon group different from ethyl, n and m are indexes, higher than 0, satisfying the equations $(n+m) \geq 0.7$ and $0.05 \leq n/(n+m) \leq 0.95$ and p is a number ranging from 0 to 0.7 with the proviso that when R is methyl and (n+m) is in the range of 0.7 to 1, the value of $n/(n+m)$ ranges from 0.05 to 0.45. The catalyst components obtained from the adducts of the present invention are capable to give catalysts for the polymerization of olefins characterized by enhanced activity with respect to the catalysts prepared from the adducts of the prior art.

62 Claims, No Drawings

MAGNESIUM DICHLORIDE-ALCOHOL ADDUCTS AND CATALYST COMPONENTS OBTAINED THEREFROM

The present invention relates to adducts between magnesium dichloride, ethanol and specific amounts of other alcohols. The adducts of the present invention are particularly useful as precursors of catalyst components for the polymerization of olefins.

$MgCl_2$.alcohol adducts and their use in the preparation of catalyst components for the polymerization of olefins are well known in the art. Catalyst components for the polymerization of olefins, obtained by reacting $MgCl_2$.nEtOH adducts with halogenated transition metal compounds, are described in U.S. Pat. No. 4,399,054. The adducts are prepared by emulsifying the molten adduct in an immiscible dispersing medium and quenching the emulsion in a cooling fluid to collect the adduct in the form of spherical particles. No physical characterization regarding the degree of cristallinity of the adducts is reported.

In WO98/44009 are disclosed $MgCl_2$.alcohol adducts having improved characteristics and characterized by a particular X-ray diffraction spectrum, in which, in the range of 2θ diffraction angles between 5° and 15°, the three main diffraction lines are present at diffraction angles 2θ of 8.8±0.2°, 9.4±0.2° and 9.8±0.2°, the most intense diffraction lines being the one at 2θ=8.8±0.2°, the intensity of the other two diffraction lines being at least 0.2 times the intensity of the most intense diffraction line. Said adducts can be of formula

$$MgCl_2.mEtOH.nH_2O$$

where m is between 2.2 and 3.8 and n is between 0.01 and 0.6. In addition to the above described X-ray spectrum, the adducts are characterized by a Differential Scanning Calorimetry (DSC) profile in which no peaks are present at temperatures below 90° C. or, even if peaks are present below said temperature, the fusion enthalpy associated with said peaks is less than 30% of the total fusion enthalpy. The catalyst components obtained from these adducts have an increased activity over those obtained from the adducts of the prior art. However, the availability of catalyst components with still improved activity is always needed in view of the economic advantages obtainable in the operation of the industrial plants.

EP 123767 discloses a catalyst component obtained by reacting a titanium compound and a vanadium compound with a solid support obtained by the spray drying of $MgCl_2$ in a mixed solution of methanol and ethanol. The spray-dried support contains a low amount of total alcohol content (about 1 mole or less of total alcohol per mole of $MgCl_2$) in combination with a generally high molar content of methanol with respect to ethanol. The activity shown by these catalysts are generally low and in particular it does not improve by partial replacement of the ethanol with methanol. In fact, example 2 in which only ethanol is used has the highest productivity.

The applicant has now found that it is possible to improve the polymerization activities of the catalyst of the prior art when the catalyst component is prepared by starting with supports containing $MgCl_2$, ethanol and another alcohol in specific proportions.

The present invention therefore relates to $MgCl_2.(EtOH)_m(ROH)_n(H_2O)_p$ adducts in which R is a C1-C15 hydrocarbon group different from ethyl, optionally substituted with heteroatoms containing groups, n and m are indexes, higher than 0, satisfying the equations $n+m \geq 0.7$ and $0.05 \leq n/(n+m) \leq 0.95$ and p is a number ranging from 0 to 0.7 with the proviso that when R is methyl and (n+m) is in the range of 0.7 to 1, the value of n/(n+m) ranges from 0.05 to 0.45.

Preferably, (n+m) is higher than 1 and in particular it ranges from 2 to 5. In a particular aspect, the value n/(n+m) ranges from 0.1 to 0.4 and preferably from 0.15 to 0.35. The index p typically ranges from 0.01 to 0.6 and particularly from 0.01 to 0.4. Preferred R groups are methyl and C3-C10 saturated hydrocarbon groups, in particular methyl and C3-C8 alkyl groups. Specific examples of ROH alcohols according to the invention are methanol, propanol, isopropanol, n-butanol, i-propanol, sec-butanol, tert-butanol, pentanol, 2-methyl-1-pentanol, 2-ethyl-1-hexanol, phenol, 4-methyl-1-phenol, 2,6-dimethyl-1-phenol, cyclohexanol, cyclopentanol. Methanol, n-butanol, sec-butanol, i-propanol, and 2-methyl-1-pentanol are, preferred. Methanol is especially preferred.

The adducts of the present invention can be prepared according to several methods. According to one of these methods the adducts are prepared by contacting the desired amounts of $MgCl_2$ ethanol and ROH alcohol, optionally in the presence of an inert liquid diluent, heating the system at the melting temperature of $MgCl_2$EtOH-alcohol adduct or above, and maintaining said conditions so as to obtain a completely molten adduct. Said molten adduct is then emulsified in a liquid medium which is immiscible with and chemically inert to it and finally quenched by contacting the adduct with an inert cooling liquid thereby obtaining the solidification of the adduct. In a specific embodiment of this method the adduct is kept at a temperature equal to or higher than its melting temperature, under stirring conditions, for a time period equal to or greater than 10 hours, preferably from 10 to 150 hours, more preferably from 20 to 100 hours. The liquid in which the molten adduct is emulsified can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred.

An alternative way for obtaining the adduct of the invention in solid form comprises the formation of the molten adduct as disclosed above and the use of an associated spray-cooling process for solidifying the adduct. When this option is pursued it is preferred that in the first step the magnesium chloride, the ethanol and the ROH alcohol be contacted to each other in the absence of an inert liquid diluent. After having been molten the adduct is sprayed, through the use of the proper devices that are commercially available, in an environment having temperature so low as to cause rapid solidification of the particles. The cold environment can comprise a cold liquid or gas. In a preferred aspect the adduct is sprayed in a cold liquid environment and more preferably in a cold liquid hydrocarbon.

Another usable method comprises contacting a ROH alcohol with an already preformed solid $MgCl_2$-ethanol adduct. The contact between the desired amounts of $MgCl_2$-ethanol adduct and the ROH alcohol can be carried out in liquid hydrocarbon medium under stirring conditions. It is also possible to add the ROH alcohol in a vapor phase, and particularly in a loop reactor as described in WO98/44009. It would be particularly preferred to use a $MgCl_2$-ethanol adduct in which part of the ethanol has been removed by physical (for example under a hot nitrogen stream) or chemical dealcoholation. These dealcoholated adducts and their preparation are described for example in EP395083 the relevant part of which is included by reference.

All these methods provide solid adducts having a substantially spherical morphology which are particularly suitable in the preparation of spherical catalyst components for the polymerization of olefins and in particular for the gas-phase polymerization process. With the term substantially spherical morphology are meant those particles having a ratio between the greater and smaller axis equal to or lower than 1.5 and preferably lower than 1.3.

As explained above while water may be one of the constituents of the adduct too high levels of it should preferably be avoided. In doing that, it can be useful to control the water content of the reactants. In fact, $MgCl_2$, EtOH and also certain ROH alcohol are highly hygroscopic and tend to incorporate water in their structure. As a result, if the water content of the reactants is relatively high, the final adducts may contain an undesired amount of water even if it has not been added as a separate component. Means for controlling or lowering the water content in solids or fluids are well known in the art. The water content in $MgCl_2$ can be for example lowered by drying it in an oven at high temperatures or by reacting it with a compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves.

As mentioned above these adducts can be advantageously used in the preparation of catalyst components for the polymerization of olefins. The said catalyst components can be obtained by contacting the adducts of the invention with compounds of transition metals belonging to one of the compound of one of the groups 4 to 6 of the Periodic Table of Elements (new notation). Among transition metal compounds particularly preferred are titanium compounds of formula $Ti(OR)_n X_{y-n}$ in which n is comprised between 0 and y; y is the valence of titanium; X is halogen and R is an alkyl radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably the contact is carried out by suspending the adduct in cold $TiCl_4$ (generally 0° C.); then the so obtained mixture is heated up to 80-130° C. and kept at this temperature for 0.5-2 hours. After that the excess of $TiCl_4$ is removed and the solid component is recovered. The treatment with $TiCl_4$ can be carried out one or more times. The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones. As a result of this contact the electron donor compound normally remains deposited on the catalyst component. In particular, the alkyl and aryl esters of mono or polycarboxylic acids such as for example esters of benzoic, phthalic, malonic, glutaric and succinic acid are preferred Specific examples of such esters are n-butylphthalate, di-isobutylphthalate, di-n-octylphthalate, diethyl 2,2-diisopropylsuccinate, diethyl 2,2-dicyclohexyl-succinate, ethyl-benzoate and p-ethoxy ethyl-benzoate. Moreover, can be advantageously used also the 1,3 diethers of the formula:

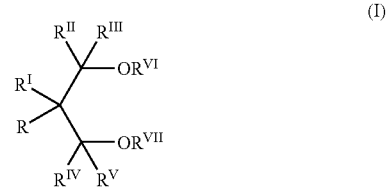

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of $R-R^V$ except that they cannot be hydrogen; one or more of the $R-R^{VII}$ groups can be linked to form a cycle. The 1,3-diethers in which $R^{VI}$ and $R^{VII}$ are selected from $C_1$-$C_4$ alkyl radicals are particularly preferred.

The electron donor compound is generally present in molar ratios with respect to the magnesium comprised between 1:4 and 1:20.

Preferably, the particles of the solid catalyst components have substantially spherical morphology and an average diameter comprised between 5 and 105 μm. With the term substantial spherical morphology are meant those particles having a ratio between the greater and smaller axis equal to or lower than 1.5 and preferably lower than 1.3.

Before the reaction with the transition metal compound, the adducts of the present invention can also be subjected to a dealcoholation treatment aimed at lowering the alcohol content and increasing the porosity of the adduct itself The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of $MgCl_2$. After the dealcoholation treatment the adducts are reacted with the transition metal compound, according to the techniques described above, in order to obtain the solid catalyst components. The solid catalyst components according to the present invention show a surface area (by B.E.T. method) generally between 10 and 500 m²/g and preferably between 20 and 350 m²/g, and a total porosity (by B.E.T. method) higher than 0.15 cm³/g preferably between 0.2 and 0.6 cm³/g. Surprisingly, the catalyst components comprising the reaction product of a transition metal compound with a $MgCl_2$-alcohol adduct which is in turn obtained by partially dealcoholating the adducts of the invention, show improved properties, particularly in terms of activity, with respect to the catalyst components prepared from the dealcoholated adducts of the prior art. The catalyst components of the invention form catalysts for the polymerization of alpha-olefins $CH_2$=CHR, wherein R is hydrogen or a hydrocarbon radical having 1-12 carbon atoms, by reaction or contact with Al-allyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 20 and 800.

In the case of the stereoregular polymerization of α-olefins such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3 diethers having the previously described formula can be used as external donor. However, in the case 1,3-diethers are used as internal donors, the use of an external donor can be avoided, as the stereospecificity of the catalyst is already sufficiently high.

As previously indicated the components of the invention and catalysts obtained therefrom find applications in the processes for the (co)polymerization of olefins of formula $CH_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (FDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

CHARACTERIZATION

Determination of Alcohol Content

The ethanol and ROH content are determined via GC analysis.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

EXAMPLES

Propylene Polymerization: General Procedure

In a 4 liter autoclave, purged with nitrogen flow at 70° C. for one our, 75 ml of anhydrous hexane containing 800 mg of $AlEt_3$, 79.8 mg of dicyclopentyldimethoxysilane and 10 mg of solid catalyst component were introduced in propylene flow at 30° C. The autoclave was closed. 1.5 Nl of hydrogen were added and then, under stirring, 1,2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and, then, weighed and fractionated with o-xylene to determine the amount of the xylene insoluble (X.I.) fraction at 25° C.

Ethylene Polymerization: General Procedure

In a 4 liter autoclave, purged with nitrogen flow at 70° C. for one our, 1500 ml of anhydrous hexane containing 3 mMols of triethyl aluminium were introduced in nitrogen flow at 30° C. Subsequently, a suspension of 20 mg of the solid catalyst component in 100 ml of hexane, containing 1.3 mMols of triethyl aluminium, were added at the same temperature. The autoclave was closed, 4 bar of hydrogen were added and the temperature was raised to 75° C. in five minutes. Then, 7 bar of ethylene were added. The polymerization was carried out at this temperature for two hours. The non-reacted ethylene and the hexane were removed, the polymer was recovered and dried at 70° C. under vacuum for three hours and, then, weighed and analyzed.

Preparation of $MgCl_2.(EtOH)_m(ROH)_n$ General Procedure

In a 2.5 L glass reactor equipped with thermometer, mechanical stirrer, reflux condenser, and purged with nitrogen, 250 mL of paraffin oil (OB55), a weighted amount of $MgCl_2$ (see Table 1), ethyl alcohol (amount in Table 1) and, optionally, the additional alcohol (type and amount in Table 1) were introduced at room temperature under nitrogen flux. The stirring was started and the temperature raised until the solid phase disappeared. The temperature was kept constant for 2 hours under stirring. A second portion of the same paraffin oil (450 mL) maintained at the same temperature was then added to the $MgCl_2$/alcohol/paraffin mixture. The stirring was then raised to 1100 RPM to obtain an emulsion of the two phases. After 0.5 min of stirring, the emulsion was transferred under nitrogen flux to a second 5 L glass reactor containing 1500 mL hexane under stirring (350-400 RPM) at −15÷−20° C. The suspension was stirred 2 h at −10° C., then the temperature was raised to 0° C. in 20 min, the stirring was continued 1 hour at this temperature. The temperature was raised to 10° C. in 20 min and, after 1 h, it was raised again to 25° C. The stirring was continued for 2 hours at 25° C. and then the mixture was allowed to settle and left to stay at 25° C. overnight.

The solid $MgCl_{2m}(EtOH)_n(ROH)$ spherical support was recovered by filtration, washed twice with 400 mL of hexane and once with 400 mL of pentane and finally dried under vacuum.

Preparation of Solid Catalyst Component: Procedure A

Into a 500 ml four-necked round flask, purged with nitrogen, 250 ml of $TiCl_4$ were introduced at 0° C. Then, were added under stirring 10.0 g of the adduct prepared according to the general method described above and an amount of 2-isopropyl-2-isopentyl-1,3-dimethoxypropane as internal donor such as to give, with respect to Mg, a molar ratio of 6. The temperature was raised to 120° C. and maintained for 60 min. Then, the stirring was discontinued, the solid product was allowed to settle and the supernatant liquid was siphoned off.

250 ml of fresh $TiCl_4$ were added. The mixture was reacted at 120° C. for 30 min and, then, the supernatant liquid was siphoned off.

Again, 250 ml of fresh $TiCl_4$ were added. The mixture was reacted at 120° C. for 30 min and, then, the supernatant liquid was siphoned off. The solid was washed six times with anhydrous hexane (6×100 ml) at 60° C. Finally, the solid was dried under vacuum and analyzed. The amount of diether (ID wt %) and the amount of Ti (wt %) contained in the solid catalyst component are reported in table 2.

Preparation of Solid Catalyst Component: Procedure B.

The same catalyst preparation procedure described in the procedure A has been followed, except that no internal donor has been used. The amount of Mg (wt %) and Ti (wt %) contained in the solid catalyst component are reported in table 2.

Examples 1-12 and Comparison Examples 13-16

The supports have been prepared according to the general procedure reported above. The specific conditions under which the supports have been prepared and the results of the analysis are shown in Table 1.

The catalyst components have been prepared according to the procedure A disclosed above and the characterization of the catalyst is shown in Table 2. The results obtained in the propylene polymerization carried out according to the general procedure reported above are summarized in Table 3.

Examples 17 and 18

The supports have been prepared according to the general procedure reported above. The specific conditions under which the supports have been prepared and the results of the analysis are shown in Table 1.

The catalyst components have been prepared according to the procedure B disclosed above and the characterization of the catalyst is shown in Table 2. The results obtained in the ethylene polymerization carried out according to the general procedure reported above are summarized in Table 3.

Example 19 and Comparison Example 20

The supports prepared according to the procedure and conditions of example 3, and comparison example 14 respectively, have been used for preparing the catalyst components according to the procedure B. The characterization of the catalysts is shown in Table 2. The results obtained in the ethylene polymerization carried out according to the general procedure reported above are summarized in Table 3.

TABLE 1

Synthesis and characterization of $MgCl_2$ supports

| | Synthesis | | | | | Characterization | | | | | | | | |
|---|---|---|---|---|---|---|---|---|---|---|---|---|---|---|
| | $MgCl_2$ | EtOH | ROH | | T | Mg | EtOH | | ROH | | | | $H_2O$ | |
| Ex. | g | g | R | g | (° C.) | % wt | % wt | m | % wt | n | m + n | n/(n + m) | % wt | p |
| 1 | 38.9 | 56.0 | Me | 5.6 | 116 | 10.7 | 46.1 | 2.27 | 4.3 | 0.30 | 2.58 | 0.12 | 0.50 | 0.06 |
| 2 | 42.2 | 65.9 | Me | 5.0 | 115 | 10.6 | 52.1 | 2.59 | 4.0 | 0.29 | 2.88 | 0.10 | 0.64 | 0.08 |
| 3 | 37.7 | 52.3 | Me | 8.0 | | 10.3 | 47.2 | 2.42 | 7.0 | 0.52 | 2.93 | 0.18 | 0.64 | 0.08 |
| 4 | 37.0 | 58.7 | Me | 10.2 | 107 | 9.5 | 50.85 | 2.82 | 8.4 | 0.67 | 3.49 | 0.19 | | |
| 5 | 38.0 | 57.3 | Me | 13.3 | 108 | 9.6 | 47.85 | 2.63 | 12.2 | 0.96 | 3.59 | 0.27 | | |
| 6 | 40.9 | 76.2 | Me | 3.7 | 114 | 9.5 | 54.7 | 3.04 | 5.95 | 0.48 | 3.51 | 0.14 | 0.90 | 0.13 |
| 7 | 40.6 | 71.0 | Me | 12.6 | 113 | 8.8 | 53.3 | 3.20 | 9.9 | 0.85 | 4.05 | 0.21 | 0.50 | 0.08 |
| 8 | 36.7 | 70.0 | Me | 7.0 | 106 | 8.8 | 57.4 | 3.44 | 6.0 | 0.52 | 3.96 | 0.13 | 0.34 | 0.05 |
| 9 | 41.6 | 65.4 | n-Bu | 10.5 | 115 | 10 | 50 | 2.64 | 10.4 | 0.34 | 2.98 | 0.11 | 0.5 | 0.07 |
| 10 | 41.2 | 64.8 | sec-Bu | 10.4 | 114 | 9.8 | 54.2 | 2.92 | 7 | 0.23 | 3.15 | 0.07 | 0.4 | 0.06 |
| 11 | 42.2 | 66.4 | i-Pr | 8.7 | 118 | 10.6 | 48.4 | 2.41 | 5.85 | 0.18 | 2.59 | 0.07 | 0.6 | 0.08 |
| 12 | 40.4 | 63.5 | 2-Me1-Pe | 14.1 | 119 | 10 | 54 | 2.85 | 13.3 | 0.32 | 3.17 | 0.10 | 0.4 | 0.05 |
| 13 comp | 36.7 | 58.6 | — | — | 116 | 10.8 | 53.5 | 2.61 | — | — | 2.61 | 0.00 | 0.45 | 0.06 |
| 14 comp | 41.8 | 70.8 | — | — | 119 | 10.4 | 59.5 | 3.02 | — | — | 3.02 | 0.00 | 0.50 | 0.06 |
| 15 comp | 22.1 | 64.1 | — | — | 98 | 9.5 | 61.8 | 3.43 | — | — | 3.43 | 0.00 | 0.50 | 0.07 |
| 16 comp | 41.1 | 84.7 | — | — | 114 | 9.2 | 62.8 | 3.60 | — | — | 3.60 | 0.00 | 0.53 | 0.08 |
| 17 | 25.3 | 42.2 | Me | 8.3 | 117 | 10 | 47.95 | 2.53 | 9.3 | 0.71 | 3.24 | 0.22 | 0.65 | 0.09 |
| 18 | 33.5 | 39.9 | Me | 11.1 | 115 | 8.8 | 42.2 | 2.53 | 11.1 | 0.96 | 3.49 | 0.27 | 0.76 | 0.12 |

TABLE 2

Composition of solid catalyst

| Example | ROH | Procedure | Ti % | Mg % | ID % |
|---|---|---|---|---|---|
| 1 | MeOH | A | 3.8 | 16.7 | 14.6 |
| 2 | MeOH | A | 4.2 | 17.3 | 14.0 |
| 3 | MeOH | A | 3.9 | 16.7 | 18.6 |
| 4 | MeOH | A | 4.8 | 21.6 | 15.1 |
| 5 | MeOH | A | 4.2 | 16.2 | 13.6 |
| 6 | MeOH | A | 3.9 | 16.8 | 13.9 |
| 7 | MeOH | A | 3.9 | 15.7 | 12.7 |
| 8 | MeOH | A | 4.4 | 16.8 | 13.9 |
| 9 | n-BuOH | A | 3.8 | 15.6 | 11.6 |
| 10 | i-PrOH | A | 3.4 | 14.1 | 12.1 |
| 11 | sec-BuOH | A | 3.7 | 15.4 | 11.6 |
| 12 | 2-Me-1-Pentanol | A | 3.9 | 17.1 | 8.7 |
| 13 comp | no | A | 3.7 | 17.1 | 15.3 |
| 14 comp | no | A | 4.0 | 17.2 | 13.2 |
| 15 comp | no | A | 3.4 | 16.6 | 17.6 |
| 16 comp | no | A | 3.8 | 15.7 | 12.2 |
| 17 | MeOH | B | 7.5 | 14.0 | — |
| 18 | MeOH | B | 8.7 | 15.5 | — |
| 19 | MeOH | B | 9.4 | 15.3 | — |
| 20 comp | no | B | 8.9 | 14.5 | — |

TABLE 3

Polymerization tests

| Example | Monomer | Yield Kg/g | XI % | MIL g/10' | MIE g/10' | F/E |
|---|---|---|---|---|---|---|
| 1 | Propylene | 75 | 96.6 | 1.4 | — | — |
| 2 | Propylene | 94 | 96.8 | 5.5 | — | — |
| 3 | Propylene | 88 | 97 | 1.6 | — | — |
| 4 | Propylene | 93 | 97.8 | 5.7 | — | — |
| 5 | Propylene | 86 | 96.6 | 6.8 | — | — |
| 6 | Propylene | 72 | 97.1 | 1.9 | — | — |
| 7 | Propylene | 101 | 96.3 | 6.1 | — | — |
| 8 | Propylene | 93 | 96.6 | 5.6 | — | — |
| 9 | Propylene | 80 | 96.8 | 5.7 | — | — |
| 10 | Propylene | 76 | 96.7 | 5.7 | — | — |
| 11 | Propylene | 77 | 97.1 | 6.4 | — | — |
| 12 | Propylene | 93 | 96.2 | 5.4 | — | — |
| 13 comp | Propylene | 67 | 97 | 2.1 | — | — |
| 14 comp | Propylene | 75 | 97.1 | 8.9 | — | — |
| 15 comp | Propylene | 64 | 96.8 | 2.7 | — | — |
| 16 comp | Propylene | 79 | 96.3 | 3.3 | — | — |
| 17 | Ethylene | 16 | — | — | 0.63 | 50.8 |
| 18 | Ethylene | 13 | — | — | 0.35 | 50.3 |
| 19 | Ethylene | 17 | — | — | 1.3 | 40 |
| 20 comp | Ethylene | 9 | — | — | 0.5 | 45 |

The invention claimed is:

1. An adduct comprising $MgCl_2 \cdot (EtOH)_m (ROH)_n (H_2O)_p$ wherein
R is a $C_1$-$C_{15}$ hydrocarbon group excluding ethyl, optionally substituted with at least one group comprising a heteroatom;
n and m are indexes higher than 0, satisfying the equations $(n+m) \geq 0.7$ and $n/(n+m)$ ranges from 0.1 to 0.4;
and p is a number ranging from 0 to 0.7 with the proviso that when R is methyl and (n+m) is in the range of 0.7 to 1, the value of $n/(n+m)$ ranges from 0.05 to 0.45.

2. The adduct according to claim 1, wherein said (n+m) is higher than 1.

3. The adduct according to claim 2, wherein said (n+m) ranges from 2 to 5.

4. The adduct according to claim 1, wherein said $n/(n+m)$ ranges from 0.15 to 0.35.

5. The adduct according to claim 1, wherein said p ranges from 0.01 to 0.6.

6. The adduct according to claim 5, wherein said p ranges from 0.01 to 0.4.

7. The adduct according to claim 1, wherein R is selected from the group consisting of a methyl, a $C_3$-$C_{10}$ saturated hydrocarbon, and derivatives thereof.

8. The adduct according to claim 1, wherein said ROH is selected from the group consisting of methanol, propanol, isopropanol, butanol, sec-butanol, tert-butanol, pentanol, 2-methyl-1-pentanol, 2-ethyl-1-hexanol, phenol, 4-methyl-1-phenol, 2,6-dimethyl-1-phenol, cyclohexanol, cyclopentanol, and derivatives thereof.

9. A method for the polymerization of olefins comprising contacting a transition metal compound comprising at least one transition metal selected from the group consisting of Ti, Zr, Hf, Rf, V, Nb, Ta, Db, Cr, Mo, W, and Sg with said adduct according to claim 1.

10. The method according to claim 9, said transition metal compound is a titanium compound of formula $Ti(OR)_n X_{y-n}$ wherein,
n is between 0 and y;
y is the valence of titanium;
X is a halogen; and
R is selected from the group consisting of an alkyl radical having 1-8 carbon atoms, a group having the formula COR, and derivatives thereof.

11. The method according to claim 10, wherein said titanium compound is selected from the group consisting of $TiCl_3$, $TiCl_4$, $Ti(OBu)_4$, $Ti(OBu)Cl_3$, $Ti(OBu)_2Cl_2$, and $Ti(OBu)_3Cl$.

12. The method according to claim 9, further comprising contacting an electron donor compound with said transition metal compound and said adduct.

13. The method according to claim 12, wherein said electron donor is selected from the group consisting of alkyl and aryl esters of mono and polycarboxylic acids.

14. The method according to claim 12, said electron donor is a 1,3 diether of the formula:

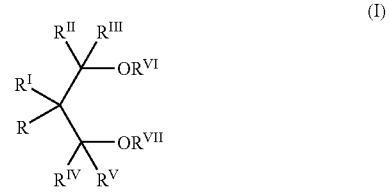

(I)

wherein R, $R^I$, $R^{II}$, $R^{III}$, $R^{IV}$ and $R^V$ are the same or different, and are selected from the group consisting of hydrogen, hydrocarbon radicals having from 1 to 18 carbon atoms, and derivatives thereof, and $R^{VI}$ and $R^{VII}$ are the same or different, and are hydrocarbon radicals having from 1 to 18 carbon atoms, and derivatives thereof.

15. The method for the polymerization of olefins according to claim 9, wherein said adduct is subjected to a dealcoholation treatment before being contacted with said transition metal.

16. A method according to claim 9, further comprising contacting an aluminium alkyl compound with said transition metal compound and said adduct.

17. The method of claim 16 wherein said aluminum compound is an Al-trialkyl compound.

18. The method of claim 17 further comprising an external donor.

19. The method of claim 18, wherein said external donor is a silane compound comprising at least one Si—OR link of formula $R_a^1R_b^2Si(OR^3)_c$, wherein
   a and b are an integer from 0 to 2;
   c is an integer from 1 to 3, the sum (a+b+c) is 4; and
   $R^1$, $R^2$, and $R^3$, are alkyl, cycloalkyl or aryl radicals with 1-18 carbon atoms.

20. A method for polymerizing olefins of formula $CH_2=CHR$, wherein R is selected from the group consisting of hydrogen, a hydrocarbon radical having 1-12 carbon atoms, and derivatives thereof, in the presence of said catalyst according to claim 17.

21. The method of claim 14, wherein one or more of said $R-R^{VII}$ groups form a cyclic link.

22. An adduct comprising $MgCl_2 \cdot (EtOH)_m(ROH)_n(H_2O)p$ wherein,
   R is a $C_1$-$C_{15}$ hydrocarbon group excluding ethyl, optionally substituted with at least one group comprising a heteroatom;
   n and m are indexes higher than 0 satisfying the equation $0.05 \leq n/(n+m) \leq 0.95$, and (n+m) ranges from 2 to 5;
   and p is a number ranging from 0 to 0.7 with the proviso that when R is methyl and (n+m) is in the range of 0.7 to 1, the value of n/(n+m) ranges from 0.05 to 0.45.

23. The adduct according to claim 22, wherein said n/(n+m) ranges from 0.1 to 0.4.

24. The adduct according to claim 22, wherein said n/(n+m) ranges from 0.15 to 0.35.

25. The adduct according to claim 22, wherein said p ranges from 0.01 to 0.6.

26. The adduct according to claim 25, wherein said p ranges from 0.01 to 0.4.

27. The adduct according to claim 22, wherein R is selected from the group consisting of a methyl, a $C_3$-$C_{10}$ saturated hydrocarbon, and derivatives thereof.

28. The adduct according to claim 22, wherein said ROH is selected from the group consisting of methanol, propanol, isopropanol, butanol, sec-butanol, tert-butanol, pentanol, 2-methyl-1-pentanol, 2-ethyl-1-hexanol, phenol, 4-methyl-1-phenol, 2,6-dimethyl-1-phenol, cyclohexanol, cyclopentanol, and derivatives thereof.

29. A method for the polymerization of olefins comprising contacting a transition metal compound comprising at least one transition metal selected from the group consisting of Ti, Zr, Hf, Rf, V, Nb, Ta, Db, Cr, Mo, W, and Sg with said adduct according to claim 22.

30. The method according to claim 29, said transition metal compound is a titanium compound of formula $Ti(OR)_nX_{y-n}$ wherein,
   n is between 0 and y;
   y is the valence of titanium;
   X is a halogen; and
   R is selected from the group consisting of an alkyl radical having 1-8 carbon atoms, a group having the formula COR, and derivatives thereof.

31. The method according to claim 30, wherein said titanium compound is selected from the group consisting of $TiCl_3$, $TiCl_4$, Ti )OBu$)_4$, Ti (OBu)Cl$_3$, Ti(OBu)$_2$Cl$_2$, and Ti (OBu)$_3$Cl.

32. The method according to claim 29, further comprising contacting an electron donor compound with said transition metal compound and said adduct.

33. The method according to claim 32, wherein said electron donor is selected from the group consisting of alkyl and aryl esters of mono and polycarboxylic acids.

34. The method according to claim 32, said electron donor is a 1,3 diether of formula:

wherein R, $R^I$, $R^{II}$, $R^{III}$, $R^{IV}$ and $R^V$ are the same or different, and are selected from the group consisting of hydrogen, hydrocarbon radicals having from 1 to 18 carbon atoms, and derivatives thereof, and $R^{VI}$ and $R^{VII}$ are the same or different, and are hydrocarbon radicals having from 1 to 18 carbon atoms, and derivatives thereof.

35. The method for the polymerization of olefins according to claim 29, wherein said adduct is subjected to a dealcoholation treatment before being contacted with said transition metal.

36. A method according to claim 29, further comprising contacting an aluminium alkyl compound with said transition metal compound and said adduct.

37. The method of claim 36, wherein said aluminum compound is an Al-trialkyl compound.

38. The method of claim 37 further comprising an external donor.

39. The method of claim 38, wherein said external donor is a silane compound comprising at least one Si-OR link of formula $Ra^1Rb^2Si(OR^3)_c$, wherein
   a and b are an integer from 0 to 2;
   c is an integer from 1 to 3, the sum (a+b+c) is 4; and
   $R^1$, $R^2$, and $R^3$, are alkyl, cycloalkyl or aryl radicals with 1-18 carbon atoms.

40. A method for polymerizing olefins of formula $CH_2=CHR$, wherein R is selected from the group consisting of hydrogen, a hydrocarbon radical having 1-12 carbon atoms, and derivatives thereof, in the presence of said catalyst according to claim 36.

41. The method of claim 34, wherein one or more of said $R-R^{VII}$ groups form a cyclic link.

42. An adduct comprising $MgCl2s(EtOH)m(ROH)n(H2O)p$ wherein,
   R is a $C_1$-$C_{15}$ hydrocarbon group excluding ethyl, optionally substituted with at least one group comprising a heteroatom;
   n and m are indexes higher than 0, satisfying the equations $(n+m) \geq 0.7$ and $0.05 \geq n/(n+m) \geq 0.95$;
   and p ranges from 0.01 to 0.6 with the proviso that when R is methyl and (n+m) is in the range of 0.7 to 1, the value of n/(n+m) ranges from 0.05 to 0.45.

43. The adduct according to claim 42, wherein said (n+m) is higher than 1.

44. The adduct according to claim 43, wherein said (n+m) ranges from 2 to 5.

45. The adduct according to claim 42, wherein said n/(n+m) ranges from 0.1 to 0.4.

46. The adduct according to claim 42, wherein said n/(n+m) ranges from 0.15 to 0.35.

47. The adduct according to claim 42, wherein said p ranges from 0.01 to 0.4.

48. The adduct according to claim 42, wherein R is selected from the group consisting of a methyl, a $C_3$-$C_{10}$ saturated hydrocarbon, and derivatives thereof.

49. The adduct according to claim 42, wherein said ROH is selected from the group consisting of methanol, propanol, isopropanol, butanol, sec-butanol, tert-butanol, pentanol, 2-methyl-1-pentanol, 2-ethyl-1-hexanol, phenol, 4-methyl-1-phenol, 2,6-dimethyl-1-phenol, cyclohexanol, cyclopentanol, and derivatives thereof.

50. A method for the polymerization of olefins comprising contacting a transition metal compound comprising at least one transition metal selected from the group consisting of Ti, Zr, Hf, Rf, V, Nb, Ta, Db, Cr, Mo, W, and Sg with said adduct according to claim 42.

51. The method according to claim 50, said transition metal compound is a titanium compound of formula $Ti(OR)_nX_{y-n}$ wherein,
n is between 0 and y;
y is the valence of titanium;
X is a halogen; and
R is selected from the group consisting of an alkyl radical having 1-8 carbon atoms, a group having the formula COR, and derivatives thereof.

52. The method according to claim 51, wherein said titanium compound is selected from the group consisting of $TiCl_3$, $TiCl_4$, $Ti(OBu)_4$, $Ti(OBu)Cl_3$, $Ti(OBu)_2Cl_2$, and $Ti(OBu)_3Cl$.

53. The method according to claim 50, further comprising contacting an electron donor compound with said transition metal compound and said adduct.

54. The method according to claim 53, wherein said electron donor is selected from the group consisting of alkyl and aryl esters of mono and polycarboxylic acids.

55. The method according to claim 53, said electron donor is a 1,3 diether of formula:
wherein R, $R^I$, $R^{II}$, $R^{III}$, $R^{IV}$ and $R^V$ are the same or different, and are selected from the group consisting of hydrogen, hydrocarbon radicals having from 1 to 18 carbon atoms, and derivatives thereof, and $R^{VI}$ and $R^{VII}$ are the same or different, and are hydrocarbon radicals having from 1 to 18 carbon atoms, and derivatives thereof.

56. The method for the polymerization of olefins according to claim 50, wherein said adduct is subjected to a dealcoholation treatment before being contacted with said transition metal.

57. A method according to claim 50, further comprising contacting an aluminium alkyl compound with said transition metal compound and said adduct.

58. The method of claim 57, wherein said aluminum compound is an Al-trialkyl compound.

59. The method of claim 58 further comprising an external donor.

60. The method of claim 59, wherein said external donor is a silane compound comprising at least one Si-OR link of formula $R_a^1R_b^2Si(OR^3)_c$, wherein
a and b are an integer from 0 to 2;
c is an integer from 1 to 3, the sum (a+b+c) is 4; and
$R^1$, $R^2$, and $R^3$, are alkyl, cycloalkyl or aryl radicals with 1-18 carbon atoms.

61. A method for polymerizing olefins of formula $CH_2=CHR$, wherein R is selected from the group consisting of hydrogen, a hydrocarbon radical having 1-12 carbon atoms, and derivatives thereof, in the presence of said catalyst according to claim 57.

62. The method of claim 55, wherein one or more of said $R-R^{VII}$ groups form a cyclic link.

* * * * *

UNITED STATES PATENT AND TRADEMARK OFFICE
CERTIFICATE OF CORRECTION

PATENT NO.         : 7,482,413 B2                                    Page 1 of 1
APPLICATION NO. : 10/550986
DATED              : January 27, 2009
INVENTOR(S)        : Giampiero Morini et al.

It is certified that error appears in the above-identified patent and that said Letters Patent is hereby corrected as shown below:

At col. 11, line 58, change "Ti)OBu)$_4$" to --Ti(OBu)$_4$--

At col. 11, line 68, claim 34 insert --

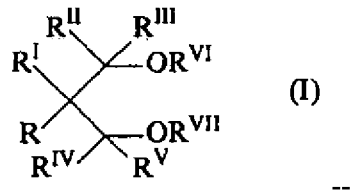

--

At col. 12, line 7, claim 38 change "olef ins" to --olefins--

At col. 12, lines 33-34, claim 45 change "MgCl2s(EtOH)m(ROH)n(H20)p" to --MgCl$_2$•(EtOH)$_m$(ROH)$_n$(H$_2$O)$_p$--

At col. 13, line 22, claim 55 insert --

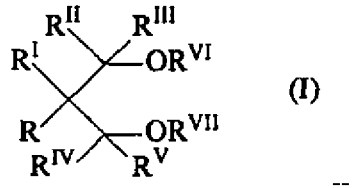

--

At col. 14, line 1, claim 56 change "olef ins" to --olefins--

Signed and Sealed this

Fifteenth Day of September, 2009

David J. Kappos
*Director of the United States Patent and Trademark Office*